(12) United States Patent
Babala et al.

(10) Patent No.: US 11,681,080 B2
(45) Date of Patent: Jun. 20, 2023

(54) LENS DESIGN AND METHODS OF MANUFACTURE THEREOF

(71) Applicant: ZF Active Safety and Electronics US LLC, Livonia, MI (US)

(72) Inventors: Michael Babala, Plymouth, MI (US); Matthew Warmuth, Northville, MI (US); Thomas E. Blake, III, Novi, MI (US)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 816 days.

(21) Appl. No.: 16/696,625

(22) Filed: Nov. 26, 2019

(65) Prior Publication Data

US 2021/0157034 A1  May 27, 2021

(51) Int. Cl.
*G02B 3/00* (2006.01)
*B29D 11/00* (2006.01)
*G02B 1/04* (2006.01)

(52) U.S. Cl.
CPC .......... *G02B 3/00* (2013.01); *B29D 11/00009* (2013.01); *G02B 1/041* (2013.01); *G02B 2003/0093* (2013.01)

(58) Field of Classification Search
CPC .. G02B 3/00; G02B 1/041; G02B 2003/0093; G02B 7/028; B29D 11/00009; B29D 11/00336; B29D 11/0048
See application file for complete search history.

(56) References Cited

U.S. PATENT DOCUMENTS

2013/0060331 A1* 3/2013 Shadduck ............... G02B 3/14
623/6.13

\* cited by examiner

*Primary Examiner* — James C. Jones
(74) *Attorney, Agent, or Firm* — Cantor Colburn LLP

(57) ABSTRACT

Disclosed herein is a lens comprising a central portion that comprises a first polymer; and a peripheral portion that comprises a second polymer; where the peripheral portion surrounds the central portion; and where the peripheral portion has a skeletal density that is greater than its bulk density. Disclosed herein too is a method of manufacturing a lens comprising injecting into a mold a molten polymer to produce the lens; where the lens comprises a central portion; and a peripheral portion; where the peripheral portion surrounds the central portion; and where the peripheral portion has a skeletal density that is greater than its bulk density.

20 Claims, 7 Drawing Sheets

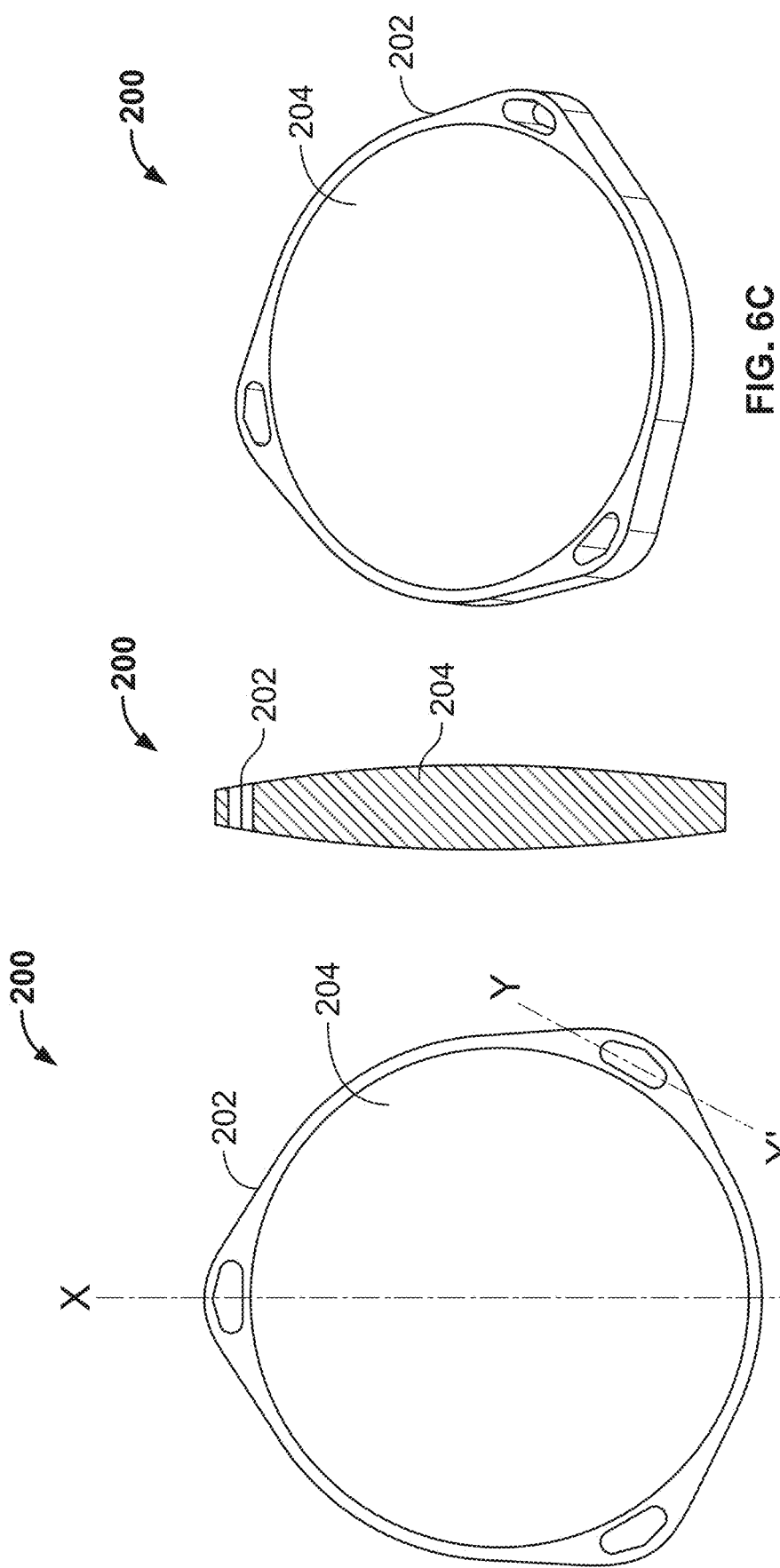

LENS DESIGN AND METHODS OF MANUFACTURE THEREOF

BACKGROUND

Disclosed herein is a lens design and methods of manufacture thereof. In particular, disclosed herein are lenses that accommodate a coefficient of thermal expansion mismatch and methods of manufacture thereof.

Advanced driver-assistance systems (ADAS) are used in vehicles to assist the driver while driving. When designed with a safe human-machine interface, they are intended to increase car safety and more generally road safety.

Advanced driver-assistance systems are systems developed to automate, adapt and enhance vehicle systems for safety and better driving. The automated system which is provided by ADAS to the vehicle is proven to reduce road fatalities, by minimizing human error that often causes accidents. Safety features are designed to avoid collisions and accidents by offering technologies that alert the driver to potential problems, or to avoid collisions by implementing safeguards and taking over control of the vehicle. Adaptive features may automate lighting, provide adaptive cruise control and collision avoidance, pedestrian crash avoidance mitigation (PCAM), incorporate satnav/traffic warnings, alert driver to other cars or dangers, lane departure warning system, automatic lane centering, show what is in blind spots, or connect to smartphones for navigation instructions. ADAS relies on inputs from multiple data sources, including automotive imaging, Light Detection and Ranging (LiDAR), radar, image processing, computer vision, and in-car networking.

In order to facilitate automotive imaging, ADAS systems often incorporate lenses as part of an optical device. In an effort to make ADAS systems accessible to a larger demographic it is desirable to lower costs while at the same time improving performance. However, lower cost lenses suffer from drawbacks that should be overcome in order render them suitable for use in ADAS systems.

SUMMARY

In one exemplary embodiment, a lens comprises a central portion that comprises a first polymer and a peripheral portion that comprises a second polymer. The peripheral portion surrounds the central portion. The peripheral portion has a skeletal density that is greater than its bulk density.

In another exemplary embodiment, the peripheral portion has a composite coefficient of thermal expansion that is lower than the coefficient of thermal expansion of the central portion.

In yet another exemplary embodiment, the first polymer is the same as the second polymer.

In yet another exemplary embodiment, the first polymer is different from the second polymer.

In yet another exemplary embodiment, the peripheral portion comprises cavities.

In yet another exemplary embodiment, the cavities are uniformly distributed throughout the peripheral portion.

In yet another exemplary embodiment, the peripheral portion comprises a foam.

In yet another exemplary embodiment, the central portion extends to the peripheral portion and the opposing faces of the peripheral portion are parallel to each other.

In yet another exemplary embodiment, a curved surface of the central portion encompasses the peripheral portion and the peripheral portion of the lens does not have parallel surfaces.

In yet another exemplary embodiment, the cavities have cross-sectional geometries viewed in a plane parallel to the paper that are square, rectangular, circular, elliptical, polygonal, or combinations thereof.

In yet another exemplary embodiment, the peripheral portion is larger in areas that contain cavities than those areas that do not contain cavities.

In yet another exemplary embodiment, the first polymer and the second polymer comprise a cyclic olefin polymer.

In yet another exemplary embodiment, the cyclic olefin polymer comprises a cyclic olefin copolymer.

In yet another exemplary embodiment, an article that comprises a lens that contains a central portion and a peripheral portion. The peripheral portion surrounds the central portion. The peripheral portion has a skeletal density that is greater than the bulk density.

In yet another exemplary embodiment, the article is an automobile.

In one exemplary embodiment, a method of manufacturing a lens comprises injecting into a mold a molten polymer to produce the lens. The lens comprises a central portion and a peripheral portion. The peripheral portion surrounds the central portion. The peripheral portion has a skeletal density that is greater than its bulk density.

In another exemplary embodiment, the molten polymer comprises a polyolefin.

In yet another exemplary embodiment, the polyolefin comprises a cyclic olefin copolymer.

In yet another exemplary embodiment, the lens is disposed in a fixture.

In yet another exemplary embodiment, the lens is disposed in a fixture that is disposed in an automobile.

The above features and advantages, and other features and advantages of the disclosure are readily apparent from the following detailed description when taken in connection with the accompanying drawings.

BRIEF DESCRIPTION OF THE FIGURES

Other features, advantages and details appear, by way of example only, in the following detailed description, the detailed description referring to the drawings in which:

FIG. 6(A) depicts another embodiment of the lens with a plurality of cavities located in the peripheral portion;

FIG. 6(B) is a cross-sectional view taken along section XX' from FIG. 6(A); and

FIG. 6(C) is an isometric view of the lens of FIG. 6(A).

DETAILED DESCRIPTION

Figure 1B:
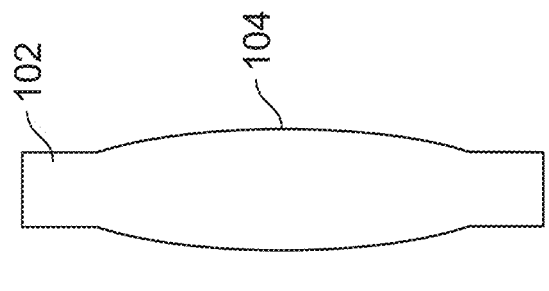
FIG. 1(B) is a depiction of a top view of the prior art lens of FIG. 1(A)

The following description is merely exemplary in nature and is not intended to limit the present disclosure, its application or uses. It should be understood that throughout the drawings, corresponding reference numerals indicate like or corresponding parts and features.

Bulk density is defined as the mass of an object divided by the volume occupied by the object. The volume occupied by the object is calculated excluding its pores or cavities. For example, consider an object of mass M having width W, height H and Length L. The object also has three circular passages of radius R drilled through its length L. The bulk density of the object is calculated by dividing mass (M) by volume (W×H×L). In other words, the volume of the holes is not taken into account in calculating the bulk density.

Skeletal density is defined as the mass of an object divided by the total volume occupied. Put another way, the skeletal density is the density of the material without any porosity or cavities. The skeletal density of the object of mass (M) detailed above would be calculated by dividing the mass (M) by volume (W×H×L−3×πR²L). In other words, the volume of the three circular passages of radius R and length L is subtracted from the volume (W×H×L) in order to derive the skeletal density. It is sometimes referred to as the true density.

DESCRIPTION OF EMBODIMENTS

Disclosed herein are lenses that comprise polymers for use in ADAS systems of automobiles. This disclosure presents a novel approach to minimize radial stresses in polymeric lens caused by mismatched coefficients of thermal expansion (CTE's) and other environmental stresses. The lenses are designed to accommodate forces caused by the CTE mismatch with supporting fixtures thus preventing damage to the lens and mitigating the effect of providing incorrect signals to the driver of an automobile that contains the ADAS system. The polymeric lens are designed to have cavities in the periphery of the lens. By locating these cavities in the periphery of the lens, the field of vision of the lens is not interfered with and the lens can undergo expansion and contraction without undergoing temporary or permanent deformation. The performance of the lens is thus stabilized, while at the same time minimizing the cost of lens used in ADAS systems.

Polymeric lenses are also much less expensive than lenses that contain glass. However, these polymeric lenses have higher coefficients of thermal expansion (CTE) than their glass counterparts, and the mismatch in the CTE with supporting fixtures (that contains the polymeric lens) often leads to undesirable deformation. Current high performance lenses used in ADAS systems are made from metal barrels and all glass elements to minimize image aberrations. These lenses differ from lenses used to display video to a driver in that the fidelity of the imagery produced by the lens is consumed by an algorithm trained to perform perception and modeling. When the consumer of the video is a human, such small aberrations are inconsequential and lower performance lenses can be used.

Figure 1A:
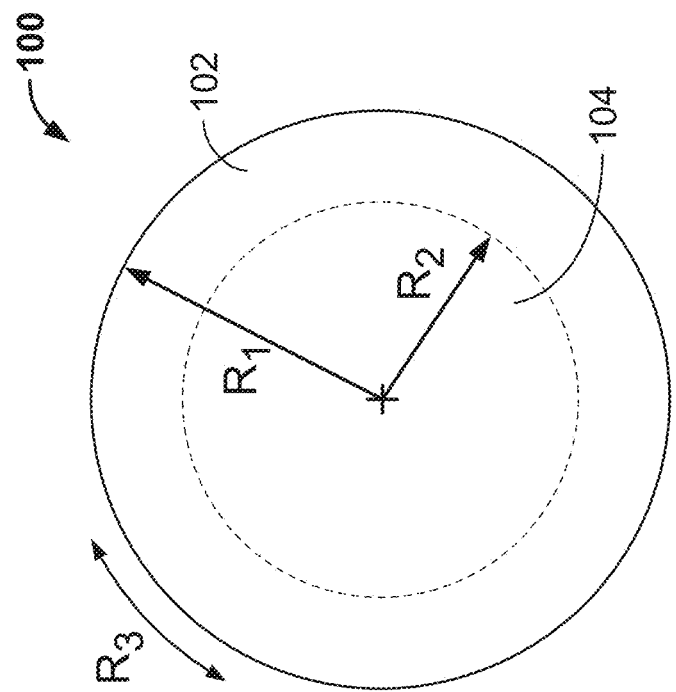
FIG. 1(A) is a depiction of a side view of a prior art lens.

FIGS. 1(A) and 1(B) depicts a conventional lens 100. The lens contains a peripheral portion 102 that surrounds a central portion 104. The light enters the lens through the central portion 104. The light entering the lens is eventually transferred to an image sensor (not shown), or the like. The lens 100 is placed in a supporting fixture (not shown) which provides support and holds it in place during operation of the automobile. In an embodiment, the peripheral portion and the central portion form one solid monolithic piece. Neither the central portion nor the peripheral portion contain any cavities.

The central portion 104 is generally circular having radius $R_2$ while the peripheral portion 102 is also circular having a radius $R_1$ that is larger than $R_2$. When the lens 100 is subjected to a temperature variation, the peripheral portion 102 expands and contracts the most in the circumferential direction (as shown by the arrow $R_3$). The maximum expansion (which will occur when there is a temperature increase) will typically promote an increase in the outer circumference of the lens 100. However, since the lens 100 is constrained in a supporting fixture (not shown) which contacts the lens 100 at its periphery 102, the material located at the periphery of the lens 100 will be subjected to compressive forces.

Similarly, when the lens 100 is subjected to a decrease in temperature, there will be a decrease in the length of the circumference of the lens 100. However, since the lens 100 is constrained in the supporting fixture (not shown) which contacts the lens 100 at its periphery 102, the material located at the periphery of the lens 100 will be subjected to elongational forces.

These continual compressive and elongational forces over time, will promote deformation of the lens. In addition, if either of these forces gets too large it may cause a temporary distortion of the lens' prescription, leading to aberrations. In order to overcome these aberrations, it is desirable to modify the periphery of the lens by including cavities in the peripheral portion so that expansions or contractions of the outer circumference of the lens can be accommodated without any temporary or permanent deformation of the lens and without any distortion of the field of view. In other words, the peripheral portion of the lens has a higher skeletal density than its bulk density.

Figures 2A, 2B, 2C:
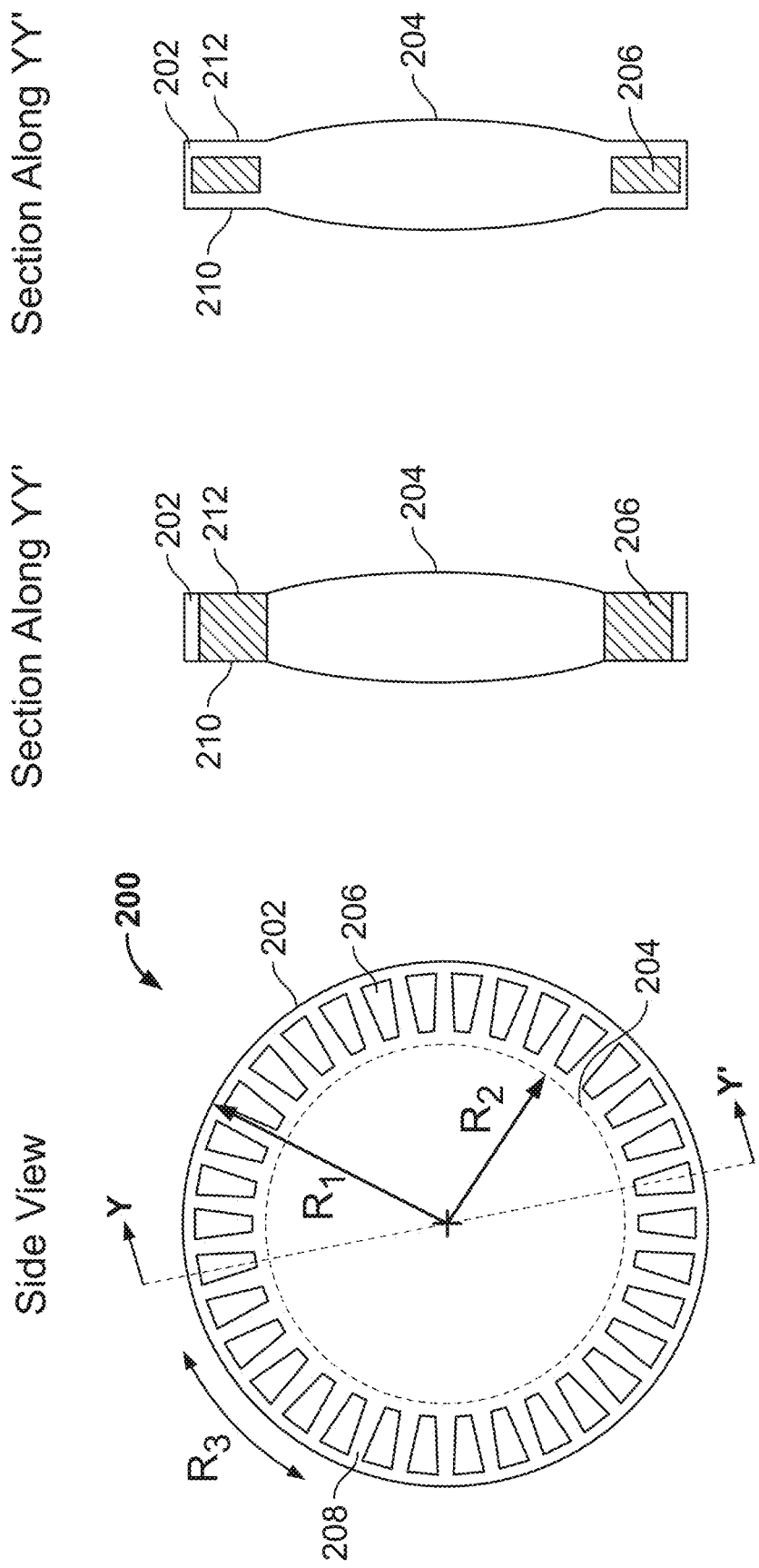
FIG. 2(A) is a depiction of a side view of an exemplary schematic of the lens disclosed herein.
FIG. 2(B) is one view of a section taken along YY' from FIG. 2(A)
FIG. 2(C) is another view of a section taken along YY' from FIG. 2(A)

FIGS. 2(A) and 2(B) demonstrate one exemplary schematic of a lens 200 that can accommodate compressive or elongational stresses without any deformation of the lens because the peripheral portion has a higher skeletal density than its bulk density. The lens 200 comprises a peripheral portion 202 that surrounds the central portion 204. The peripheral portion is in continuous contact with the central portion. In an embodiment, the peripheral portion and the central portion form one solid monolithic piece. The peripheral portion 202 contains a plurality of cavities 206 that are distributed there through. A portion of the cavities in the peripheral portion are not used for accommodating fasteners such as screws, bolts, nuts, rivets, and the like, that are generally used for affixing the lens to supporting fixtures. A portion of the cavities in the peripheral portion may be used for accommodating fasteners such as screws, bolts, nuts, rivets, and the like, that are generally used for affixing the lens to supporting fixtures. Supporting fixtures are structures that hold the lens in place during its use. FIG. 2(A) is a front view of an inventive lens that contains cavities 206 distributed through the peripheral portion 202 while FIG. 2(B) is a sectional view taken along YY' from the FIG. 2(A). In an embodiment, some of the cavities may be used for both—accommodating dimensional increases or decreases due to a change in temperature as well as for accommodating fasteners such as screws, bolts, nuts, rivets, and the like, that are generally used for affixing the lens to supporting fixtures.

Figure 3B:
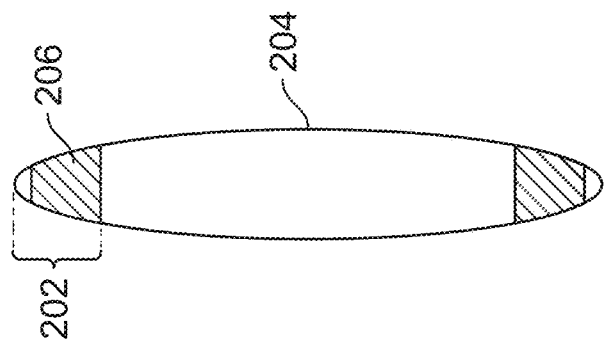
FIG. 3(B) is one view of a section taken along YY' from FIG. 3(A)
Figure 3A:
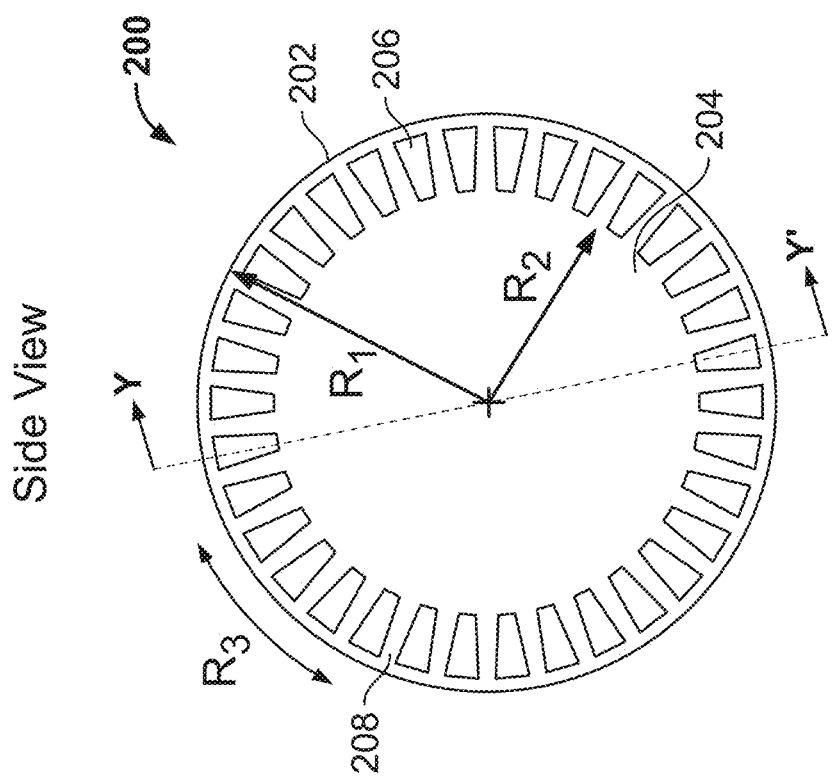
FIG. 3(A) is a depiction of a side view of an exemplary schematic of the lens disclosed herein.

FIGS. 3(A) and 3(B) are depictions of another exemplary embodiment of the lens 200. The difference between the lens of the FIGS. 2(A) and 3(A), lies in the shape of the lens and the consequent change in the shape of the respective cavities. In the FIG. 2(A), the lens 200 comprises a central portion 204 whose curvature ends when it contacts the peripheral portion 202 (which has parallel opposing faces or sides 210 and 212) (See FIG. 2(B). In the FIG. 3(A), the curved surface of the central portion of the lens encompasses the peripheral portion 202. The peripheral portion 202 of the lens in the FIG. 3(B) does not have parallel surfaces.

In the FIGS. 2(A), 2(B), 3(A) and 3(B), it may be seen that the peripheral portion 202 is concentric with the central portion 204. In an embodiment, the peripheral portion 202 is coaxial with the central portion 204. It is also to be noted that while the lens displayed in the FIGS. 2(A), 2(B), 3(A) and 3(B) have opposing convex surfaces, the lens may also have opposing concave surfaces, or alternatively have one convex surface with an opposing concave surface.

The cavities 206 present in the peripheral portion absorb forces produced by the CTE mismatch with the supporting fixture (not shown). The supporting fixture contacts the lens 200 at its periphery and most heat transfer occurs between the peripheral portion and the supporting fixture. The presence of the cavities 206 permits the polymeric material in the peripheral portion 202 to expand into the cavities thereby minimizing the forces that are transmitted from the peripheral portion to the central portion. Further, if the solid portion 202 forms an angle greater than zero with $R_1$, stress will be further reduced with a spring effect. This prevents distortion of the central portion and minimizes aberrations of the object being imaged. It also prevents constant replacement of the lens that would otherwise occur because of permanent deformation (sometimes referred to as permanent set). In an embodiment, the peripheral portion includes a plurality of cavities that surround the entire central portion of the lens. In another embodiment, the peripheral portion includes a plurality of cavities that extend around only a portion of the central portion of the lens.

The number of cavities depend upon the size of each cavity, the radius of the lens and the area occupied by the peripheral portion of the lens. In an embodiment, the peripheral portion includes 3 or more cavities, 4 or more cavities, 5 or more cavities to up to 100 or less cavities, 75 or less cavities, and 50 or less cavities.

In an embodiment, with reference now to the FIG. 2(A), the cavity walls 208 are closer to each other at the outer radius $R_1$ than they are at the inner radius $R_2$. Since greater strains will more likely be encountered as one moves further from the center of the lens, this feature provides better absorption of a CTE mismatch with the surrounding materials (e.g., the supporting fixture). The cavities in the FIG. 2(B) extend from one surface 210 to the opposing surface 212 of the peripheral portion (i.e., they extend through the thickness of the peripheral portion). It is to be noted that the cavities do not have to extend from the surface 210 to the opposing surface 212, they can be internally disposed in the peripheral portion 202 and be surrounded by the polymer on all sides as seen in the FIG. 2(C). The FIG. 2(C) is another section taken along YY' of the FIG. 2(A). In this event, the internally located cavities 206 may be filled with a cooling fluid or a phase transfer material, which are capable of absorbing some of the heat that the lens is subjected to. It is to be noted that in this embodiment, the cooling fluid or the phase transfer material will be permanently trapped in the cavities.

The cavity 206 may have a variety of geometrical shapes. The geometrical shapes may be regular (have shapes defined by Euclidean geometry) or irregular (have shapes that are non-Euclidean). For example, the cross-sectional area of the cavity along a plane that encompasses the line YY' (in the FIGS. 2(A) and 3(A)) may be rectangular, circular, square, elliptical, polygonal, or a combination thereof. Similarly the cross-sectional area of the cavity along a plane that is perpendicular to the plane that encompasses the line YY' may be rectangular, circular, square, elliptical, polygonal, or a combination thereof. The cavities 206 may be uniformly or non-uniformly distributed along the peripheral portion. They may be periodic or aperiodic. In a preferred embodiment, the cavities have regular shapes and are uniformly distributed in the peripheral portion.

In an embodiment, equivalent cavity-like structures may be produced in the peripheral portion by foaming a portion of the polymer. The foamed portion exists in only the peripheral portion and ensures that the skeletal density of the peripheral portion is greater than the bulk density of the same region. The foamed portion may include an open cell foam, a closed cell foam, or a combination thereof. It may extend in a band around the entire lens, or alternatively, extend in only parts of peripheral portion.

Figure 4B:
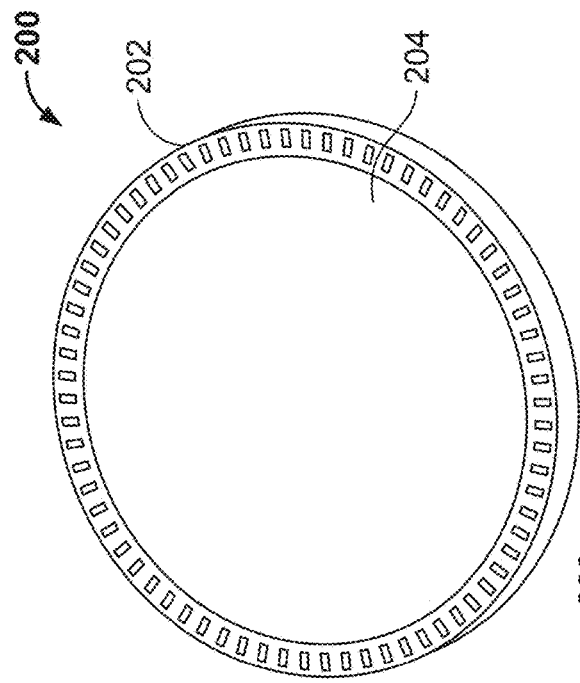
FIG. 4(B) is a depiction of a lens with rectangular cavities in the peripheral portion.
Figure 4C:
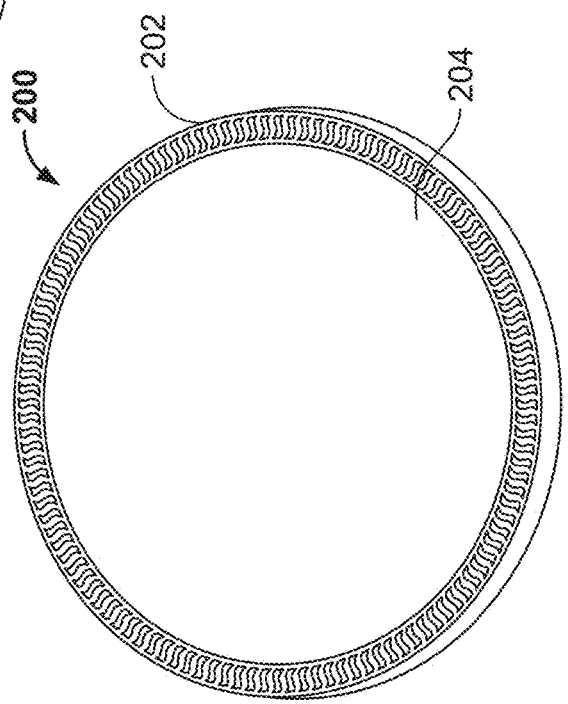
FIG. 4(C) is a depiction of a lens with S-shaped cavities in the peripheral portion.
Figure 4A:
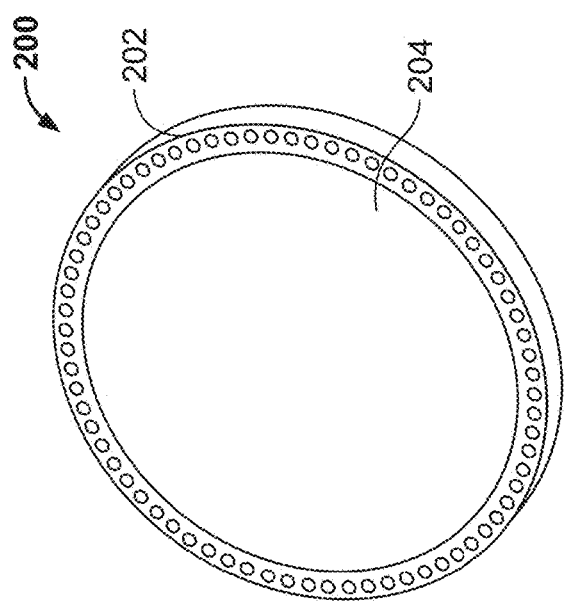
FIG. 4(A) is a depiction of a lens with circular cavities in the peripheral portion.

The FIGS. 4(A), 4(B), 4(C), 4(D) and 4(E) depict isometric views of a variety of different cavities that can be used in the peripheral region 202 to provide CTE matching features to the lens 200. FIG. 4(A) is an exemplary depiction of a lens 200 that has cavities with a circular cross-sectional profile (in a plane parallel to the paper) distributed along the peripheral portion 202, while the FIG. 4(B) is an exemplary depiction of a lens 200 that has cavities with a rectangular cross-sectional profile (in a plane parallel to the paper) distributed along the peripheral portion 202. FIG. 4(C) is an exemplary depiction of a lens 200 that has cavities with a S-shaped cross-sectional profile (in a plane parallel to the paper) distributed along the peripheral portion 202.

Figure 4E:
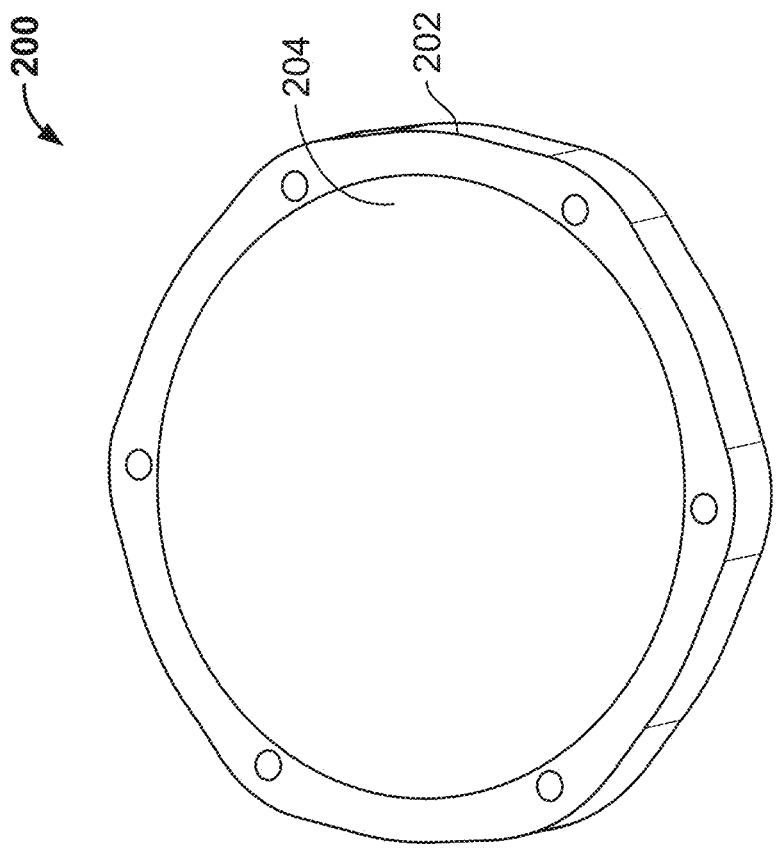
FIG. 4(E) is a depiction of a lens with circular cavities in the peripheral portion.
Figure 4D:
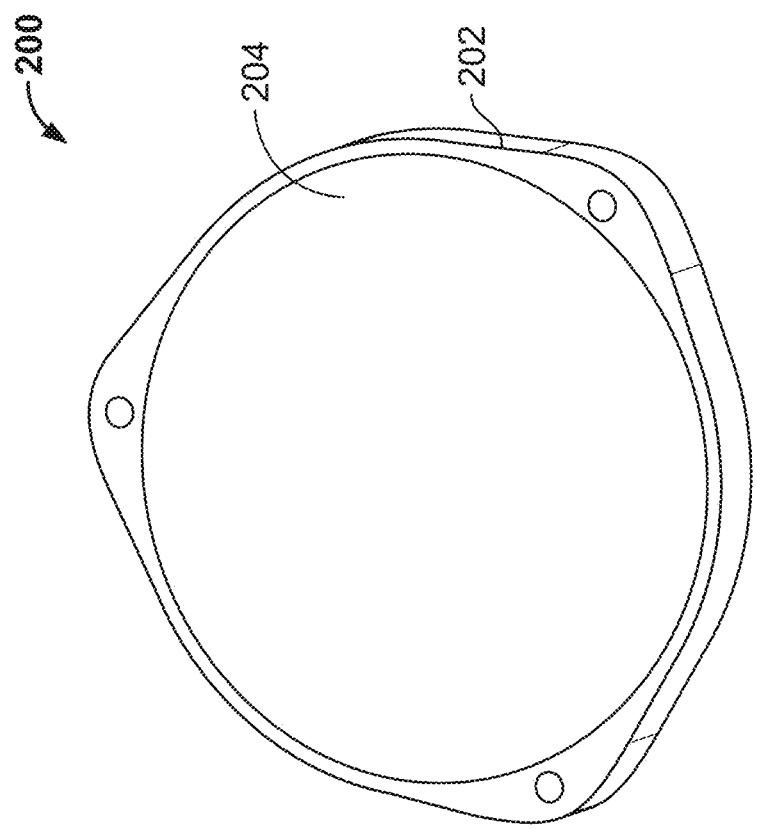
FIG. 4(D) is a depiction of a lens with circular cavities in the peripheral portion.

FIGS. 4(D) and 4(E) are exemplary depictions of lens 200 that have cavities that are uniformly distributed but spaced further apart than those depicted in the FIGS. 4(A) through 4(C). In the FIGS. 4(D) and 4(E), it may also be observed that the areas that have cavities have a larger radius that the remainder of the peripheral portion 202 that does not have cavities.

While the FIGS. 4(A) through 4(E) depict lenses that have a peripheral region with opposing parallel surfaces that extends outwards from the central portion 104 (similar to the lens in the FIGS. 2(A) and 2(B)), these features can also be incorporated into lenses (not shown) where the curvature extends to the outer boundary of the lens (i.e., where the curved surface of the lens encompasses the peripheral portion (similar to the lens in the FIGS. 3(A) and 3(B)).

Figure 5C:
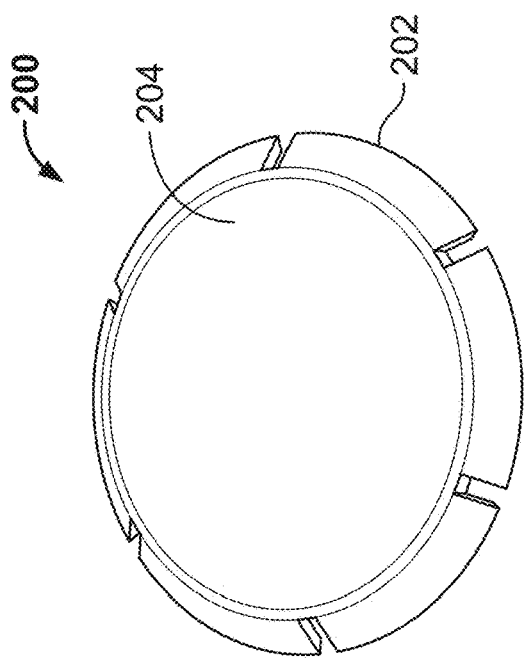
FIG. 5(C) depicts an isometric view of the lens of the FIG. 5(A)
Figure 5D:
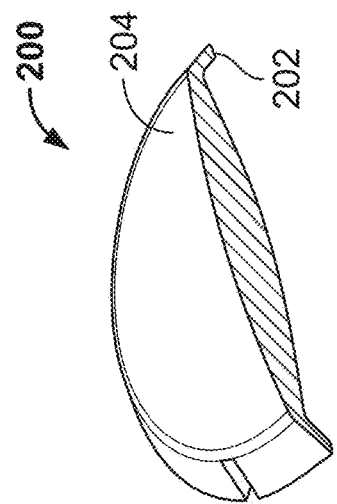
FIG. 5(D) depicts an isometric view of the lens of the FIG. 5(B)
Figure 5B:
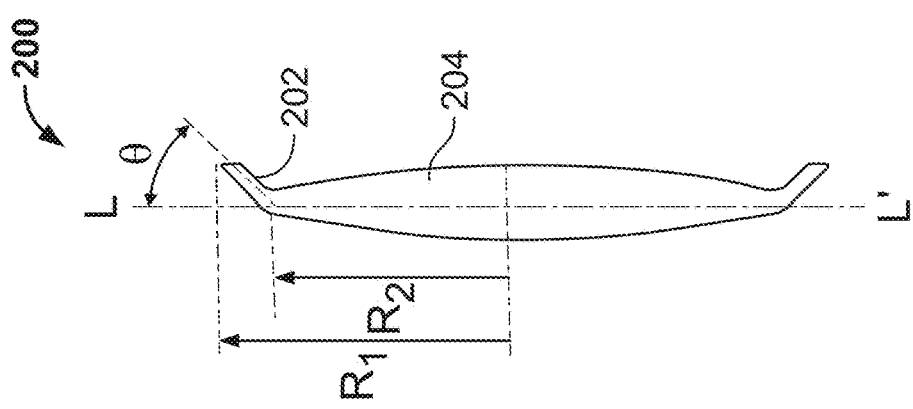
FIG. 5(B) depicts a cross-sectional view of the lens of the FIG. 5(A)

FIGS. 5(A), 5(B), 5(C) and 5(D) depict another embodiment of the lens 200. In the FIG. 5(A), it may be seen that the peripheral portion 202 (that surrounds the central portion 204) contains cavities that are in the form of slots 214 and extend from the inner radius ($R_2$) (See FIG. 5(B) to the outer radius of peripheral portion ($R_1$). In addition, the peripheral portion 202 is angled with respect to an axis (LL') that passes through the center of mass of the lens as well as through an outer corner 216 where the central portion 204 meets the peripheral portion. The FIG. 5(B) is a depiction of the cross-section of the lens taken along section XX' of the FIG. 5(A). As can be seen the peripheral portion is angled at an angle θ with respect to the axis LL'. The angle θ can vary from 5 degrees to 60 degrees, preferably 15 to 45 degrees. At least a portion of the plurality of slots are not used to accommodate fasteners such as screws, bolts, nuts, rivets, and the like, that are generally used for affixing the lens to supporting fixtures. At least some of the slots may be used to accommodate fasteners such as screws, bolts, nuts, rivets, and the like, that are generally used for affixing the lens to supporting fixtures.

Figure 5A:
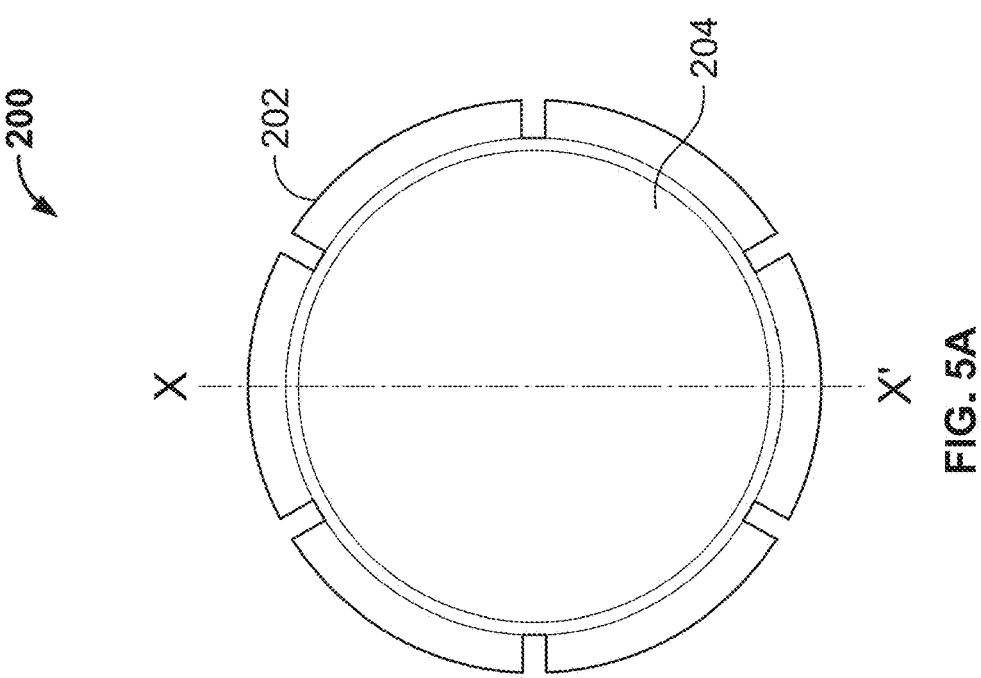
FIG. 5(A) depicts another embodiment of the lens with a plurality of cavities located in the peripheral portion.

FIGS. 5(C) and 5(D) are isometric views of the lens of the FIGS. 5(A) and 5(B) respectfully. When the lens is subjected to temperature changes, the cavities 214 in the peripheral portion 202 absorb some of the differential expansion that occurs between the central portion 204 and the peripheral portion 202 thus preventing distortion of the field of view.

FIG. 6(A) is another exemplary depiction of a lens 200 where the peripheral portion 202 is much larger at the location of the cavities 214 than it is elsewhere around the lens. In other words, the radius at the cavity 214 location is greater than it is for the remainder of the peripheral portion 202. The cavity may have an elongated cross sectional area (where the elongated axis YY' is parallel to a tangent to the circumference), so that it can accommodate a change in material dimensions due to a change in temperature. The elongated cross-sectional area of the cavity also permits the cavity to be used for accommodating fasteners such as screws, bolts, nuts, rivets, and the like, that are generally used for affixing the lens to supporting fixtures. FIG. 6(B) is a cross-sectional view of the lens of FIG. 6(A). As may be seen in the FIG. 6(B) the peripheral portion 202 of the lens 200 is encompassed by the curvature of the central portion 204 of the lens. FIG. 6(C) depicts an isometric view of the lens 200 of FIG. 6(A). In FIG. 6(C) too it can be seen that the regions that enclose cavities 214 have a much larger radius than the radius of the remainder of the peripheral portion 202.

As noted above, the peripheral portion of the lens has a skeletal density that is greater than the bulk density. The skeletal density of the peripheral portion may be equal to the bulk density of the central portion of the lens. It is also to be understood that the coefficient of thermal expansion of the peripheral portion is lower than the coefficient of thermal expansion of the central portion. The coefficient of thermal expansion of the peripheral portion is a composite value of the coefficient of thermal expansion for the material in the cavities (air) and that for the material of construction of the lenses, while the coefficient of thermal expansion of the central portion is only that for the material of construction of the lenses.

The material used in the lenses is a polymer that is optically transparent. In an embodiment, the polymer is preferably one that is water resistant, ultraviolet radiation resistant and abrasion resistant. Water resistant and/or abrasion resistant coatings may be disposed on the lenses if desired. UV resistant coatings, thermal stabilizers, UV absorbers, infrared resistant coatings, and the like, may also be used in or on the lenses. It is desirable for the polymeric material to have a transmissivity of greater than 85%, preferably greater than 90% and more preferably greater than 95% when measured as per ASTM D1003. The refractive index of the polymer used in the lenses can be 1.1 to 1.7, preferably 1.2 to 1.65 and more preferably 1.45 to 1.58. Higher refractive index coatings such as those containing titania or zirconia may be disposed on the lens if desired.

In an embodiment, a single polymer may be used in the entire lens. In another embodiment, a first polymer may be used in the central portion of the lens, while a second polymer may be used in the peripheral portion. In one embodiment, the first polymer may be the same as the second polymer. In another embodiment, the first polymer may be different from the second polymer.

The polymer used in the lens may be selected from a wide variety of thermoplastic polymers, blend of thermoplastic polymers, thermosetting polymers, or blends of thermoplastic polymers with thermosetting polymers. The polymer is preferably an organic polymer. The polymer may comprise a blend of polymers, copolymers, terpolymers, or combinations thereof. The polymer can also be an oligomer, a homopolymer, a copolymer, a block copolymer, an alternating block copolymer, a random copolymer, a graft copolymer, a star block copolymer, a dendrimer, a polyelectrolyte (polymers that have some repeat groups that contain electrolytes), a polyampholyte (a polyelectrolyte having both cationic and anionic repeat groups), an ionomer, or the like, or a combination thereof. The organic polymers have number average molecular weights greater than 10,000 grams per mole, preferably greater than 20,000 g/mole and more preferably greater than 50,000 g/mole. An upper number average molecular weight for the polymers may be 1,000,000 g/mole.

Examples of the organic polymers that may be used in the lenses are polyolefins, polyacrylics, polyacrylates, polymethacrylates, polycarbonates, polystyrenes, polyesters, polyimides, polyetherimides, or the like, or a combination thereof. Polyolefin lenses are preferred.

The polyolefins are preferably those that have low ultraviolet (UV) absorption when exposed to ambient light. Suitable examples of polyolefins are cyclic olefin polymers. In an embodiment, the cyclic olefin polymer comprises a cyclic olefin copolymer. Cyclic olefin copolymers are manufactured by chain copolymerization of cyclic monomers such as 8,9,10-trinorborn-2-ene (norbornene) or 1,2,3,4,4a,5,8,8a-octahydro-1,4:5,8-dimethanonaphthalene (tetracyclododecene) with ethene (such as TOPAS Advanced Polymer's TOPAS®, Mitsui Chemical's APEL®), or by ring-opening metathesis polymerization of various cyclic monomers followed by hydrogenation (Japan Synthetic Rubber's ARTON®, Zeon Chemical's ZEONEX® and ZEONOR®).

In one embodiment, in one method of manufacturing the disclosed lens, a suitable polymer (such as, for example, one or more of the cyclic olefin copolymers listed above) is fed to an injection molding machine, where it is molded in a mold that has a negative image of the lens shown in the figures. The polymer is injected to the mold at a suitable flow temperature that prevents the formation of pin holes and other defects. The walls of the mold are cooled with a coolant causing the melt to solidify at which point it is ejected from the mold. Vast numbers of lenses can be produced in this manner.

In an embodiment, the lens may also be manufactured by methods such as compression molding, vacuum forming, blow molding, and so on. In another embodiment, additive manufacturing may be used to produce the lens disclosed herein. In yet another embodiment, a combination of one or more of injection molding, vacuum forming, blow molding, compression molding may be used in conjunction with additive manufacturing.

In an embodiment, the molding operation to manufacture the mold is prepared in a two-step process. In another embodiment, when the lens comprises a peripheral portion that is foamed, the foamed peripheral portion may be first injection molded in a first molding step. Suitable blowing agents such as liquid carbon dioxide, liquid nitrogen and the like may be used to produce the foam. The molded, foamed peripheral portion is then placed in a second mold whereupon the central portion is injected to the mold and is fused with the peripheral portion during the second molding operation. The polymer used in the central portion (the first polymer) may or may not be the same as the polymer (the second polymer) used in the peripheral portion. The mold is then cooled and the molded lens with a foamed peripheral portion and an optically clear central portion is then ejected.

The lens can be treated to remove any mold lines and then placed in the structural fixture for use in automobiles, medical devices such as catheters that are inserted into the body and downhole drilling tools in order to measure the excavation progress.

While the invention has been described with reference to some embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A lens comprising:
   a central portion that comprises a first polymer; and
   a peripheral portion that comprises a second polymer;
      where the peripheral portion surrounds a circumference of the central portion; and where the peripheral portion has a skeletal density that is greater than its bulk density.

2. The lens of claim 1, where the peripheral portion has a composite coefficient of thermal expansion that is lower than the coefficient of thermal expansion of the central portion.

3. The lens of claim 1, where the first polymer is the same as the second polymer.

4. The lens of claim 1, where the first polymer is different from the second polymer.

5. The lens of claim 1, where the peripheral portion comprises cavities.

6. The lens of claim 5, where the cavities are uniformly distributed throughout the peripheral portion.

7. The lens of claim 1, where the peripheral portion comprises a foam.

8. The lens of claim 1, where the central portion extends to the peripheral portion and where opposing faces of the peripheral portion are parallel to each other.

9. The lens of claim 1, where a curved surface of the central portion encompasses the peripheral portion and wherein the peripheral portion of the lens does not have parallel surfaces.

10. The lens of claim 5, where the cavities have cross-sectional geometries viewed in a plane parallel to the paper that are square, rectangular, circular, elliptical, polygonal, or combinations thereof.

11. The lens of claim 5, where the peripheral portion is larger in areas that contain cavities than those areas that do not contain cavities.

12. The lens of claim 3, where the first polymer and the second polymer comprise a cyclic olefin polymer.

13. The lens of claim 12, where the cyclic olefin polymer comprises a cyclic olefin copolymer.

14. An article that comprises the lens of claim 1.

15. The article of claim 14, where the article is an advanced driver-assistance system.

16. A method of manufacturing a lens comprising:
    injecting into a mold a molten polymer to produce the lens; where the lens comprises:
       a central portion; and
       a peripheral portion; where the peripheral portion surrounds a circumference of the central portion; and where the peripheral portion has a skeletal density that is greater than its bulk density.

17. The method of claim 16, wherein the molten polymer comprises a polyolefin.

18. The method of claim 17, wherein the polyolefin comprises a cyclic olefin copolymer.

19. The method of claim 16, further comprising disposing the lens in a fixture.

20. The method of claim 19, wherein the lens disposed in the fixture is disposed in an advanced driver-assistance system.

* * * * *